United States Patent
Schlotter

(10) Patent No.: US 7,326,012 B2
(45) Date of Patent: Feb. 5, 2008

(54) BROACHING APPARATUS AND METHOD FOR PRODUCING A GEAR MEMBER WITH TAPERED GEAR TEETH

(75) Inventor: Laurent Schlotter, Dettwiller (FR)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/428,068

(22) Filed: Jun. 30, 2006

(65) Prior Publication Data

US 2008/0003074 A1  Jan. 3, 2008

(51) Int. Cl.
*B23D 37/10* (2006.01)
*B23D 43/00* (2006.01)

(52) U.S. Cl. .................. 409/259; 409/269; 409/59; 409/260; 407/13; 407/18; 407/19

(58) Field of Classification Search ............... 409/259, 409/260, 261, 269, 268, 244, 26, 49, 59; 407/13, 18, 19
See application file for complete search history.

(56) References Cited

U.S. PATENT DOCUMENTS

| | | | | |
|---|---|---|---|---|
| 1,713,390 A * | 5/1929 | Lundell | ................ | 407/18 |
| RE21,316 E * | 1/1940 | Hill | ................ | 74/462 |
| 2,464,915 A * | 3/1949 | Wildhaber | ................ | 409/26 |
| 2,683,919 A * | 7/1954 | Psenka | ................ | 407/18 |
| 2,898,670 A * | 8/1959 | Pernack | ................ | 407/18 |
| 3,178,800 A * | 4/1965 | Psenka | ................ | 407/16 |
| 3,217,383 A * | 11/1965 | Psenka | ................ | 407/18 |
| 3,231,962 A * | 2/1966 | Psenka | ................ | 407/18 |
| 3,259,019 A * | 7/1966 | Bibbens | ................ | 409/49 |
| 4,462,723 A * | 7/1984 | Walter et al. | ................ | 407/18 |
| 5,224,804 A * | 7/1993 | Shepley | ................ | 409/244 |
| 5,352,068 A * | 10/1994 | Roseliep | ................ | 407/15 |
| 5,435,676 A * | 7/1995 | Yera et al. | ................ | 409/244 |
| 5,503,506 A * | 4/1996 | Yuan | ................ | 407/13 |
| 5,865,569 A * | 2/1999 | Holstein et al. | ................ | 407/13 |
| 6,409,442 B1 * | 6/2002 | Berktold et al. | ................ | 409/269 |
| 6,527,484 B2 * | 3/2003 | Nakamura et al. | ................ | 407/13 |
| 6,857,827 B2 * | 2/2005 | Heyraud | ................ | 407/13 |
| 6,918,716 B2 * | 7/2005 | Berktold et al. | ................ | 407/18 |

* cited by examiner

*Primary Examiner*—Dana Ross

(57) ABSTRACT

The apparatus of the present invention provides a broaching machine configured to produce an internal gear member. The broaching machine includes a broaching tool defining a central axis. The broaching tool includes a first set of broaching teeth configured to cut both a first flank portion and a second flank portion of a plurality of gear teeth. The broaching tool also includes a second set of broaching teeth configured to cut only the second flank portion of the plurality of gear teeth. The plurality of gear teeth are formed such that the first and second flank portions of each gear tooth are tapered between a first end portion and a second end portion. The broaching machine also includes a motor configured to rotate the broaching tool about the central axis at a selectable rate and in a selectable direction. A corresponding method for producing an internal gear member is also provided.

16 Claims, 2 Drawing Sheets

BROACHING APPARATUS AND METHOD FOR PRODUCING A GEAR MEMBER WITH TAPERED GEAR TEETH

TECHNICAL FIELD

The present invention pertains generally to a broaching apparatus and method for producing a gear member with tapered gear teeth.

BACKGROUND OF THE INVENTION

When a planetary gearset is under load, even under light load in the context of generally experienced gear noise situations, the planet carrier may deflect and the planet pinion bearings, which are not perfectly rigid, may become slightly displaced. As a result, the gears of a planetary gearset may not remain perfectly parallel under load. In other words, gears that perfectly mesh in theory may, under actual working conditions, contact each other at a point that is not centered in the middle of the tooth flank.

It is well known to subject gear members to a heat treatment process in order to improve material characteristics such as strength or rigidity. Under certain circumstances, the heat treatment process can vary or alter tooth flank geometry which can also cause misalignment between the teeth of engaged gear members. This misalignment, either from planet carrier deflection or from the heat treatment process, can shift the load distribution on a gear tooth thereby increasing gear noise and reducing durability.

SUMMARY OF THE INVENTION

The present invention provides a broaching machine configured to produce an internal gear member. The broaching machine includes a broaching tool defining a central axis. The broaching tool includes a first set of broaching teeth configured to cut both a first flank portion and a second flank portion of a plurality of gear teeth; and a second set of broaching teeth configured to cut only the second flank portion of the plurality of gear teeth. The plurality of gear teeth are formed such that the first and second flank portions of each gear tooth are tapered between a first end portion and a second end portion. The broaching machine also includes a motor configured to rotate the broaching tool about the central axis at a selectable rate and in a selectable direction.

The present invention also provides a method for forming an internal gear member having a plurality of gear teeth. The method includes providing a broaching tool having a first set of broaching teeth and a second set of broaching teeth, and providing a gear blank defining an internal aperture. The broaching tool is passed through the internal aperture of the gear blank to form the gear teeth. The broaching tool is rotated at a first predefined rate as it passes through the internal aperture of the gear blank such that the first set of broaching teeth cut both a first flank portion and a second flank portion of each tooth. The broaching tool is then rotated at a second predefined rate as it passes through the internal aperture of the gear blank such that the second set of broaching teeth cut only the second flank portion of each tooth.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
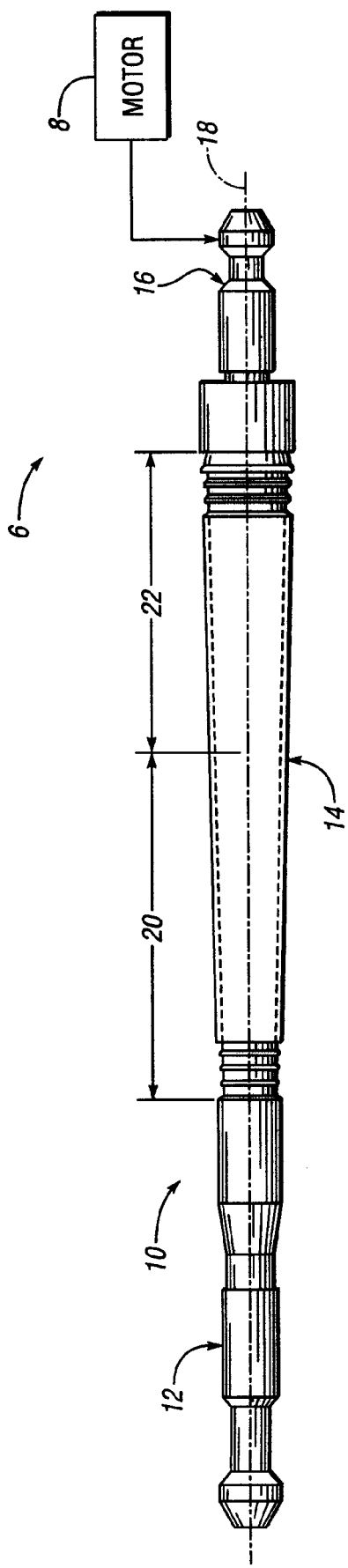
FIG. 1 is a schematic illustration of a broaching machine in accordance with the present invention.

Referring to the drawings, wherein like reference numbers refer to like components, FIG. 1 shows a broaching machine 6 in accordance with the present invention. The broaching machine 6 includes a motor 8 configured to selectively rotate a broaching tool 10 about an axis 18 as will be described in detail hereinafter. The broaching tool 10 includes a shank 12, a plurality of broach teeth 14, and an end portion 16. The plurality of broach teeth 14 are not explicitly shown in FIG. 1, but are schematically represented by the series of annular ribs or flanges shown. It should be appreciated by one skilled in the art that the annular ribs each include a sequence of notches (not shown) to form the individual broach teeth 14. The plurality of broach teeth 14 include a first section of teeth 20 and a second section of teeth 22.

Figure 2:
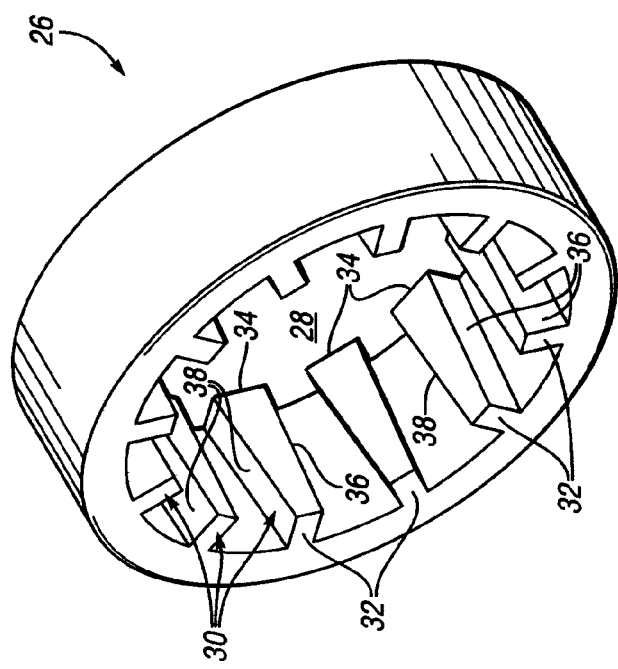
FIG. 2 is a perspective illustration of an internal gear member produced in accordance with a method of the present invention.

Referring to FIG. 2, a gear member 26 produced in accordance with the method of the present invention is shown. The gear member 26 is preferably machined from an annular gear blank (not shown) defining a centrally located aperture 28. As will be described in detail hereinafter, the broaching tool 10 is pulled through the aperture 28 to form a plurality of internal gear teeth 30. The gear teeth 30 each define a first end portion 32, a second end portion 34, a first flank 36 and a second flank 38. The gear teeth 30 are tapered, which means that the first and second flanks 36, 38 are not parallel. According to the preferred embodiment, the first end portion 32 is generally parallel to the second end portion 34, and the second end portion 34 is wider than the first end portion 32. The tapered configuration of the first and second flanks 36, 38 in combination with the parallel first and second end portions 32, 34 are generally configured to define a trapezoidal cross section for the teeth 30 as shown in FIG. 2.

The gear member 26 is preferably supported as the broaching tool 10 is pulled through the aperture 28 to cut the gear teeth 30. According to the preferred embodiment, the gear member 26 is preferably rigidly supported and the broaching tool 10 is selectively rotated about its axis 18 as it is pulled through the aperture 28. According to an alternate embodiment, the gear member 26 may rotate while the broaching tool 10 is pulled through the aperture 28 in a non-rotating manner. According to another alternate embodiment, both the gear member 26 and the broaching tool 10 can both be rotated as the broaching tool 10 is pulled through the aperture 28.

Figure 3A:
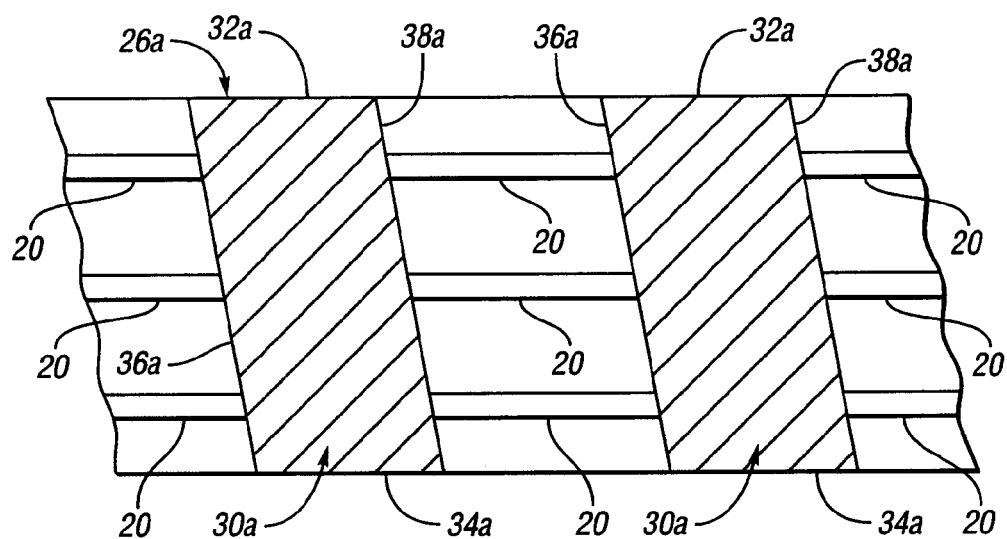
FIG. 3a is a schematic sectional illustration of the gear member of FIG. 2 engaged by broaching teeth shown in FIG. 1 during a first stage of broaching formation.
Figure 3B:
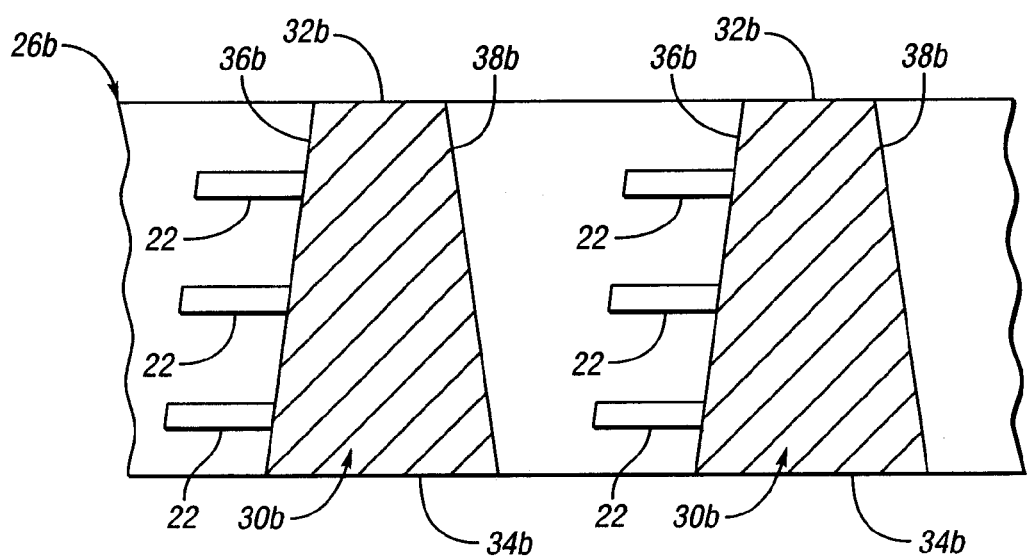
FIG. 3b is a schematic sectional illustration of the gear member of FIG. 2 engaged by broaching teeth shown in FIG. 1 during a second stage of broaching formation.

FIGS. 3a-3b illustrate a sequence of steps or stages during which the gear member 26 is formed. More precisely, FIG. 3a shows a first stage wherein a gear member 26a is formed by the broaching teeth 20, and FIG. 3b shows a second stage wherein a gear member 26b is formed by the broaching teeth 22. Like reference numbers are used in FIGS. 3a-3b to refer to like components from FIGS. 1 and 2. For example, the suffix "a" added to a reference numeral identifies a similar component during a first stage of formation. Similarly, the suffix "b" added to a reference numeral identifies a similar component during second stage of formation.

Referring to FIG. 3a, a sectional view of the gear member 26a during a first stage of formation is shown. As shown, the broach teeth 20 engage both the first and second flanks 36a, 38a to produce a plurality of generally parallel gear teeth 30a. During this stage, the broaching tool 10 (shown in FIG. 1) is rotated about its central axis 18 (shown in FIG. 1) in a counter-clockwise direction such that the gear teeth 30a formed during this stage define a parallelogram but are not rectangular. In other words, the flanks 36a, 38a are not perpendicular to the end portions 32a, 34a. The angle formed between the flanks 36a, 38a and the end portions 32a, 34a is selectable by controlling the rate at which the broaching tool 10 is rotated. For purposes of the present invention, the gear teeth 30a are "parallel" when the first and second flanks 36a, 38a of each gear tooth 30a are generally parallel with each other. Additionally, the first and second end portions 32a, 34a are preferably generally parallel with each other and substantially the same length.

Referring to FIG. 3b, a sectional view of the gear member 26b during a second stage of formation is shown. During this stage, the broaching tool 10 (shown in FIG. 1) is rotated about its central axis 18 (shown in FIG. 1) in a clockwise direction such that the broaching teeth 22 are brought into engagement with the first flank 36b of each tooth 30b. As shown, the first flank 36b of each tooth 30b becomes "tapered" or non-parallel relative to the second flank 38b as the first flank 36b is cut by the broaching teeth 22. The rate at which the broaching tool 10 is rotated is selectable to control the degree of taper of the first flank 36b. The first and second end portions 32b, 34b are preferably generally parallel, and one of the end portions (e.g., the first end portion 32b) is narrower than the other of the end portions (e.g., the second end portion 34b).

In addition to producing a gear member having square gear teeth as shown in FIG. 2, the method of the present invention may also be implemented to produce a helical gear member (not shown) such as those used in a planetary gearset. To produce a helical gear member, a helical broaching tool (not shown) is generally rotated in only one direction, however the rate of rotation is varied.

Advantageously, the tapered geometry of gear members produced in accordance with the present invention can be adapted to accommodate for carrier deflection of a planetary gearset (not shown) which is under load. Therefore, the alignment of the gear members within a planetary gearset may be improved by incorporating tapered gear teeth such that gear noise is reduced and durability is increased. Similarly, it has been observed that the tapered gear tooth geometry can be adapted to accommodate for tooth flank deformation caused by a heat treatment process. In other words, the gear teeth can be tapered by an amount necessary to compensate for heat treatment induced tooth flank deformation and thereby improve tooth alignment of engaged gear members.

While the best modes for carrying out the invention have been described in detail, those familiar with the art to which this invention relates will recognize various alternative designs and embodiments for practicing the invention within the scope of the appended claims.

The invention claimed is:

1. A method for forming an internal gear member having a plurality of gear teeth comprising:
   providing a broaching tool having a first set of broaching teeth and a second set of broaching teeth;
   providing a gear blank defining an internal aperture;
   passing the broaching tool through the internal aperture of the gear blank;
   rotating the broaching tool at a first predefined rate as the broaching tool passes through the internal aperture of the gear blank such that the first set of broaching teeth cut both a first flank portion and a second flank portion of the plurality of gear teeth; and
   rotating the broaching tool at a second predefined rate as the broaching tool passes through the internal aperture of the gear blank such that the second set of broaching teeth cut only the second flank portion of the plurality of gear teeth;
   wherein the broaching tool is rotated sufficiently such that the first and second flank portions of each gear tooth are tapered between a first end portion and a second end portion so that one of said end portions is narrower than the other of said end portions.

2. The method of claim 1, further comprising rotating the broaching tool in one direction as the first set of broaching teeth cut both the first flank portion and the second flank portion of the plurality of gear teeth, and rotating the broaching tool in an opposite direction as the second set of broaching teeth cut only the second flank portion of the plurality of gear teeth.

3. A broaching tool configured to form an internal gear member comprising:
   a first set of broaching teeth configured to cut both a first flank portion and a second flank portion of a plurality of gear teeth; and
   a second set of broaching teeth configured to cut only the second flank portion of the plurality of gear teeth;
   such that the first and second flank portions of each gear tooth are tapered between a first end portion and a second end portion so that one of said end portions is narrower than the other of said end portions.

4. The broaching tool of claim 3, further comprising a shank.

5. The broaching tool of claim 3, further comprising an end portion.

6. The broaching tool of claim 3, wherein said first set of broaching teeth extend along a first length of said broaching tool, and wherein said second set of broaching teeth extend along a second length of said broaching tool different from said first length.

7. The broaching tool of claim 6, wherein at least one of said first and second sets of broaching teeth has an involute profile.

8. The broaching tool of claim 7, wherein only said second set of broaching teeth has said involute profile.

9. A broaching machine configured to produce an internal gear member comprising:
   a broaching tool defining a central axis including:
      a first set of broaching teeth configured to cut both a first flank portion and a second flank portion of a plurality of gear teeth; and
      a second set of broaching teeth configured to cut only the second flank portion of the plurality of gear teeth;
      such that the first and second flank portions of each gear tooth are tapered between a first end portion and a second end portion so that one of said end portions is narrower than the other of said end portions; and a motor configured to rotate the broaching tool about the central axis at a selectable rate and in a selectable direction to form said tapered flank portions.

10. The broaching machine of claim 9, wherein the broaching tool includes a shank.

11. The broaching machine of claim 10, wherein the broaching tool includes an end portion.

12. The broaching machine of claim 9, wherein said first set of broaching teeth extend along a first length of said broaching tool, and wherein said second set of broaching teeth extend along a second length of said broaching tool different from said first length.

13. The broaching machine of claim 12, wherein at least one of said first and second sets of broaching teeth has an involute profile.

14. The broaching machine of claim 13, wherein only said second set of broaching teeth has said involute profile.

15. The broaching machine of claim 9, wherein said motor is further configured to rotate said broaching tool in a counter-clockwise direction about said central axis to thereby cut both said first and second flank portions of said plurality of gear teeth via said first set of broaching teeth.

16. The broaching machine of claim 15, wherein said motor is further configured to rotate said broaching tool in a clockwise direction about said central axis to thereby cut only said second flank portions of said plurality of gear teeth via said second set of broaching teeth.

* * * * *